United States Patent Office 3,376,193
Patented Apr. 2, 1968

3,376,193
17 - ACYLATES OF 9α - FLUORO - 11β,17α - DIHYDROXY - 16 - METHYL - 1,4 - PREGNADIENE-3,20-DIONE AND CORRESPONDING-11-KETO STEROIDS AND PHARMACEUTICAL COMPOSITIONS THEREOF
Joseph Elks and Esme Joan Bailey, London, England, assignors to Glaxo Laboratories Limited, Greenford, England, a British company
No Drawing. Continuation-in-part of application Ser. No. 428,242, Jan. 26, 1965. This application June 23, 1965, Ser. No. 466,434
Claims priority, application Great Britain, Jan. 28, 1964, 3,622/64
15 Claims. (Cl. 167—65)

This application is a continuation-in-part of our application Ser. No. 428,242 filed Jan. 26, 1965, now abandoned.

This invention is concerned with new steroid compounds having inter alia high anti-inflammatory action on topical administration.

An important use of anti-inflammatory compounds is in topical preparations for the local treatment of inflammations and considerable research has been directed to finding compounds having good local action on topical administration.

It is an object of the invention to provide new steroid compounds having particularly high anti-inflammatory action on topical application.

We have found that certain 17-esters of certain 21-desoxy steroids, hereinafter described, in general provide considerably enhanced anti-inflammatory action following topical application as compared with other closely analogous compounds. These new esters have in fact been found to possess anti-inflammatory action on topical application exceeding that of some of the best compounds hitherto especially proposed for topical purposes (as judged for example by the patch test of McKenzie et al. Arch. Derm., 1962, 86, 608).

According to the present invention therefore there are provided compounds represented by the general formula:

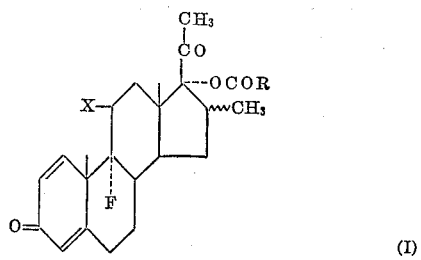

(I)

where X is a hydroxyl group in the β-configuration or a keto group, and R is an alkyl group containing a straight chain of up to three carbon atoms which may be branched by a methyl group.

The invention further includes pharmaceutical preparations comprising one or more compounds of the above general formula in association with one or more pharmaceutical carriers or excipients.

According to this invention 17α-acetoxy-9α-fluoro-11β-hydroxy-16β-methylpregna - 1,4-diene-3,20-dione; 17α-acetoxy - 9α - fluoro - 16β - methylpregna-1,4-diene-3,11,20-trione; 17α - propionyloxy - 9α - fluoro-11β-hydroxy-16β-methylpregna-1,4-diene-3,20-dione; 17α-propionyloxy-9α-fluoro - 16β - methylpregna-1,4-diene-3,11,20-trione; 17α-butyryloxy - 9α-fluoro-11β-hydroxy-16β-methylpregna-1,4-diene-3,20 dione; 17α - isobutyryloxy-9α-fluoro-11β-hydroxy-16β-methylpregna-1,4-diene-3,20-dione and 17α-isovaleryloxy - 9α-fluoro-11β-hydroxy-16β-methylpregna-1,4-diene-3,20-dione are particularly preferred compounds. 17α - Propionyloxy - 9α-fluoro-11β-hydroxy-16β-methylpregna-1,4-diene-3,20-dione in particular is a compound having extremely high anti-inflammatory action on topical administration.

The active steroid may be formulated into a preparation suitable for topical administration in conventional manner in a topical vehicle with the aid of one or more carriers or excipients. Examples of various types of preparation include ointments, lotions, creams, powders, drops, suppositories, retention enemas, chewable or suckable tablets or pellets (e.g. for the treatment of aphthous ulcers) and aerosols. Ointments and creams may for example, be formulated with an aqueous or oily base with the addition of suitable thickening and/or gelling agents. Such base may thus, for example, include water and/or an oil such as liquid paraffin or a vegetable oil such as arachis oil or castor oil. Thickening agents which may be used according to the nature of the base include soft paraffin, aluminium stearate, cetostearyl alcohol, polyethylene glycols, woolfat, hydrogenated lanolin, beeswax etc.

Lotions may be formulated with an aqueous or oily base and will in general also include one or more of the following namely, emulsifying agents, dispersing agents, suspending agents, thickening agents, colouring agents, perfumes and the like.

Powders may be formed with the aid of any suitable powder base e.g. talc, lactose, starch etc. Drops may be formulated with an aqueous base also comprising one or more dispersing agents, suspending agents, solubilising agents etc.

The proportion of active steroid in the topical compositions according to the invention depends on the precise type of formulations to be prepared but will generally be within the range of from 0.0001% to 5% by weight. Generally however for most types of preparations advantageously the proportion used will be within the range of from 0.001–0.5% and preferably 0.01 to 0.25%.

For topical application e.g. in the treatment of inflammations topical compositions as above described may be applied to the affected area one or more times per day.

The compositions according to the invention may also include one or more preservatives or bacteriostatic agents e.g. methyl hydroxy benzoate, propyl hydroxy benzoate, chlorocresol, benzalkonium chlorides etc. The compositions according to the invention may also contain other active ingredients such as antimicrobial agents, particularly antibiotics.

According to a further feature of the invention the new compounds according to the invention are prepared by acylating a compound of the general formula

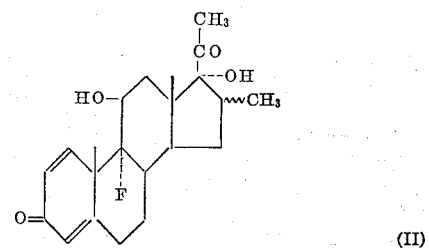

(II)

to introduce the RCOO-radical at the 17-position, the 11β-hydroxy group being if desired oxidised to a keto group before or after the acylation.

The acylation may be carried out by treating the parent 17-hydroxy compound with the appropriate acid anhydride or acid chloride, if desired in the presence of a non-hydroxylic solvent and in the presence of a strong acid catalyst. The non-hydroxylic solvent may for example be chloroform, methylene chloride or benzene and the strong acid catalyst may for example be perchloric acid toluene-p-sulphonic acid or a strongly acidic cation exchange resin e.g. Amberlite IR 120. The optimum reaction conditions, particularly of acid concentration and reaction time, should be determined by pilot experiments using thin layer chromatography.

In a further method of acylation the parent 17α-hydroxy compound may be reacted with the appropriate aliphatic acid in the presence of trifluoroacetic anhydride.

The carboxylic acid esters of 11-dehydro-21-desoxy compounds can for example be prepared from the corresponding 11-hydroxy compounds (a) by oxidation of the 11β-hydroxy group, conveniently with chromic anhydride in a tertiary organic base e.g. pyridine and subsequently acylating the 17-position as described above or (b) by reversing the procedure i.e. acylating the 17-position first as described above and subsequently oxidising the 11β-hydroxyl position.

For a better understanding of the invention the following examples are given by way of illustration only. In the examples all temperatures are given in ° C.

Example 1.—17α-acetoxy-9α-fluoro-11β-hydroxy-16β-methylpregna-1,4-diene-3,20-dione 9α - fluoro - 11β,17α - dihydroxy - 16β - methylpregna-1,4 - diene - 3,20 - dione (1 g.) was suspended in benzene (200 ml.) and acetic anhydride (12 ml.) containing 60% perchloric acid (0.012 ml.) was added; the solution was shaken at room temperature for 1¾ hours, the reaction being followed by thin layer chromatography. The small amount of undissolved solid was filtered off, and the filtrate was washed with sodium bicarbonate solution and water, dried and evaporated to dryness. The white solid was titrated with benzene to remove some 11,17-diacetate, filtered and crystallised from a mixture of acetone and petroleum to give 17α-acetoxy-9α-fluoro-11β-hydroxy-16β-methylpregna-1,4-diene-3,20-dione (250 mg.) with M.P. 255–259°, $[\alpha]_D + 74°$ (c. 1.0 in CHCl$_3$) $\lambda_{max.}^{EtOH}$ 238 m$\mu$ ($\epsilon$ 15,500)

(Found: C, 68.5; H, 7.1. $C_{24}H_{31}FO_5$ requires C, 68.8; H, 7.5%.)

Example 2.—9α-fluoro-11β-hydroxy-16β-methyl-17α-propionyloxypregna-1,4-diene-3,20-dione The reaction was carried out as in Example 1, propionic anhydride being substituted for acetic anhydride and the reaction time being increased to 2 hours. The crude solid was crystallised twice from a mixture of acetone and petroleum to give 9α-fluoro-11β-hydroxy-16β-methyl-17α-propionyloxypregna-1,4,diene-3,20-dione (19.8%), M.P. 240–245°. (Found: C, 68.9; H, 7.6. $C_{25}H_{33}FO_5$ requires C, 69.3; H, 7.6%.)

Example 3.—17α-butyryloxy-11β-hydroxy-9α-fluoro-16β-methylpregna-1,4-diene-3,20-dione The reaction was carried out as in Example 1 butyric anhydride being substituted for acetic anhydride and with a reaction time of 2 hours. The benzene was evaporated off under reduced pressure, methanol (100 ml.) and sodium bicarbonate (100 ml.) were added and the solution was stirred at room temperature for 4 hours to decompose the excess butyric anhydride. The methanol was distilled off, water was added and the steroid was isolated with chloroform. Two crystallisations from a mixture of acetone and petroleum gave 17α-butyryloxy-11β-hydroxy-9α-fluoro-16β-methylpregna-1,4-diene-3,20-dione (16%), M.P. 250–255°. $[\alpha]_D + 66°$ (c. 1.0 in CHCl$_3$) $\lambda_{max}$ 238–240 m$\mu$, ($\epsilon$ 15,900). (Found: C, 7.2; H, 8.0. $C_{26}H_{35}FO_5$ requires C, 69.9; H, 7.9%.)

Example 4

(a) 9α-fluoro-17α-hydroxy-16β-methylpregna-1,4-diene-3,11,20-trione

Chromium trioxide (5 g.) was added slowly to stirred pyridine (50 ml.); 9α - fluoro - 11β,17α - dihydroxy - 16β-methylpregna-1,4-diene-3,20-dione (5 g.) in pyridine (35 ml.) was added and the mixture was allowed to stand at room temperature overnight. Chloroform was added and the solution was stirred for 30 min.; it was then filtered, and the chloroform extract was washed with 2 N-hydrochloric acid, sodium bicarbonate solution and water. The solution was dried, charcoaled to remove coloured impurities, and evaporated to dryness. Crystallisation from acetone gave 9α-fluoro-17α-hydroxy-16β-methylprenga-1,4-diene-3,11,20-trione (2.5 g.) M.P. 247–253°, $[\alpha]_D + 150°$ (c. 1.0 in CHCl$_3$), $\lambda_{max.}^{EtOH}$ 235 m$\mu$ ($\epsilon$, 15,700) (Found: C, 70.6; H, 7.4. $C_{22}H_{27}FO_4$ requires C, 70.5; H, 7.3%.)

(b) 17α-acetoxy-9α-fluoro-16β-methylpregna-1,4-diene-3,11,20-trione

9α - fluoro - 17α - hydroxy - 16β - methylpregna - 1,4-diene-3,11,20-trione (800 mg.) was suspended in benzene (100 ml.) and acetic anhydride (8.6 ml.) containing perchloric acid (60% 0.012 ml.) was added. The solution was stirred at room temperature for 2 hours, the reaction being followed by thin layer chromatography. The benzene solution was washed with sodium bicarbonate solution and water, dried, filtered and evaporated to dryness under reduced pressure. Crystallisation from a mixture of acetone and petroleum gave 17α-acetoxy-9α-fluoro-16β-methylpregna-1,4-diene-3,11,20-trione (500 mg.), M.P. 250–253°, $[\alpha]_D + 111°$ (c. 1.0 in CHCl$_3$), $\lambda_{max.}^{EtOH}$ 236 m$\mu$ ($\epsilon$ 15,500)

(Found: C, 69.3; H, 7.2. $C_{24}H_{29}FO_5$ requires C, 69.3; H, 7.2%.)

Example 5.—17α-acetoxy-9α-fluoro-16β-methylpregna-1,4-diene-3,11,20-trione

Chromic anhydride (150 mg.) was carefully added to stirred pyridine (2 ml.); a solution of 17α-acetoxy-9α-fluoro-11β-hydroxy - 16β - methylpregna-1,4-diene-3,20-dione (45 mg.) in pyridine (3 ml.) was added and the mixture was stirred overnight at room temperature. Chloroform was added and the mixture was stirred for a further 30 minutes; it was then filtered and the chloroform layer was washed with 2 N-hydrochloric acid and water, dried, charcoaled and evaporated to dryness, to give 17α - acetoxy-9α-fluoro-16β-methylpregna-1,4-diene-3,11,20-trione (43 mg.). Crystallisation from a mixture of acetone and petroleum gave the crystalline material with M.P. 250–253°.

Example 6.—17α-isobutyryloxy-11β-hydroxy-9α-fluoro-16β-methylpregna-1,4-diene-3,20-dione 9α-fluoro - 11β,17α - dihydroxy-16β-methylpregna-1,4-diene-3,20-dione (1 g.) was suspended in benzene (200 ml.) and isobutyric anhydride (12 ml.) containing perchloric acid (60%; 0.012 ml.) was added; the solution was stirred for 6 hours at room temperature. Sodium bicarbonate solution was added and the solution was stirred overnight to decompose the excess isobutyric anhydride. The benzene layer was separated, washed with water, dried (MgSO$_4$) and evaporated to dryness.

Trituration with benzene gave a white solid (300 mg.) which was filtered off. Two crystallisations from acetone-petroleum gave 17α-isobutyryloxy-11β-hydroxy-9α-fluoro-16β-methylpregna-1,4-diene-3,20-dione (148 mg.), M.P. 253–259°, $[α]_D+74°$ (c. 0.5 in CHCl$_3$), $λ_{max.}^{EtOH}$ 238 mμ, (ε 16,060)
(Found: C, 70.3; H, 8.2. C$_{26}$H$_{35}$FO$_5$ requires C, 69.9; H, 7.9%.)

Example 7.—17α-propionyloxy-9α-fluoro-16β-methylpregna-1,4-diene-3,11,20-trione

9α-fluoro-17α-hydroxy - 16β - methylpregna-1,4-diene-3,11,20-trione (500 mg.) was dissolved in methylene chloride (40 ml.) and propionic anhydride (20 ml.) containing 60% perchloric acid (0.04 ml.) was added. After 4 hours the solution was washed with sodium bicarbonate and water and the methylene chloride was distilled off. Methanol and sodium bicarbonate solution were added and the solution was stirred for 1 hour. The methanol was distilled off and the residual solid was filtered off, dried and crystallised from acetone-petrol, with addition of charcoal; to yield 200 mg. of 17α-propionyloxy-9α-fluoro - 16β - methylpregna-1,4-diene-3,11,20-trione M.P. 183–185°, $[α]_D+111°$ (c. 0.5 in CHCl$_3$) $λ_{max.}^{EtOH}$ 234–235 mμ (ε 15,500)

Example 8.—17α-isovaleryloxy-9α-fluoro-11β-hydroxy-16β-methylpregna-1,4-diene-3,20-dione 9α-fluoro-11β,17α-dihydroxy - 16β - methylpregna-1,4-diene-3,20-dione (1 g.) was dissolved in chloroform (120 ml.; alcohol free) and isovaleric anhydride (20 ml.) containing 60% perchloric acid (0.025 ml.) was added. The solution was allowed to stand at room temperature for 20 minutes and was then washed with aqueous sodium bicarbonate and water, dried and evaporated. Methanol (100 ml.) and sodium bicarbonate solution (100 ml.) were added and the solution was stirred for 16 hours; the steroid was then extracted with chloroform in the usual way. The solution was evaporated to ca. 5 ml., and the steroid was precipitated by addition of petrol; the white solid (530 mg.) was filtered off and crystallised from acetone-hexane to give 9α-fluoro-11β-hydroxy-16β-methyl-17α-isovaleryloxypregna-1,4-diene-3,20-dione (300 mg.), M.P. 231–234°, $[α]_D+72°$ (c. 1.0 in CHCl$_3$) $λ_{max.}^{EtOH}$ 237–239 mμ (ε= 15,700)

(Found: C, 70.15; H, 7.9. C$_{27}$H$_{37}$FO$_5$ requires C, 70.4; H, 8.1%.)

Example 9.—17α-propionyloxy-9α-fluoro-11β-hydroxy-16β-methylpregna-1,4-diene-3,20-dione 9-fluoro - 11β,17α - dihydroxy-16β-methylpregna-1,4-diene-3,20-dione (20 g.) and p-toluenesulphonic acid (20 g.) were dissolved in methylene chloride (2000 ml.), propionic anhydride (200 ml.) was added and the solution was allowed to stand at room temperature for 18 hours. The solution was washed with aqueous sodium bicarbonate and water and the solvent was distilled off; ethanol and sodium bicarbonate solution were added and the solution was stirred at room temperature for 30 mins. to decompose excess propionic anhydride. The solution was re-extracted with chloroform and worked up in the usual way. Trituration with benzene gave a white solid (12.7 g.) which, on crystallisation from acetone-hexane, gave 17α-propionyloxy-9α-fluoro-11β-hydroxy - 16β - methylpregna-1,4-diene-3,20-dione (9.9 g.); M.P. 241–246°, $[α]_D+76°$ (c. 1.0 in CHCl$_3$). $λ_{max.}^{EtOH}$ 238 mμ (ε 16,300)
(Found: C, 69.3; H, 7.7. C$_{25}$H$_{33}$FO$_5$ requires C, 69.3; H, 7.6%.)

Example 10.—17α-propionyloxy-9α-fluoro-11β-hydroxy-16β-methylpregna-1,4-diene-3,20-dione 9α-fluoro - 11β,17α - dihydroxy-16β-methylpregna-1,4-diene-3,20-dione (25 mg.), propionic acid (2 ml.) and trifluoroacetic anhydride (0.5 ml.) were mixed and left to stand at room temperature for 16 hours. The solution was poured into water, the product was extracted with chloroform and the extract was washed with aqueous sodium bicarbonate and evaporated to dryness. Examination of the residue by thin-layer chromatography showed the presence, as major component, of material with the same R$_F$ as the required 17-propionate, together with two minor components.

Example 11.—17α-propionyloxy-9α-fluoro-11β-hydroxy-16β-methylpregna-1,4-diene-3,20-dione A mixture of 9α-fluoro-11β,17α-dihydroxy-16β-methylpregna-1,4-diene-3,20-dione (100 mg.), propionyl chloride (1 ml.), 60% perchloric acid (10 mg.), and methylene chloride (10 ml.) was stirred until clear, and was then left at room temperature. After 5 hours, thin-layer chromatography indicated the presence of the 17-propionate as major product, together with some 11,-17-dipropionate.

Example 12.—17α-acetoxy-9α-fluoro-11β-hydroxy-16β-methylpregna-1,4-diene-3,20-dione 9α - fluoro - 11β,17α - dihydroxy - 16β - methylpregna-1,4-diene-3,20-dione (25 mg.) in acetic anhydride (5 ml.) was stirred overnight with Amberlite IR 120 (a cross-linked polystyrene resin bearing sulphonic acid groups; H$^+$ form: 50 mg.). Chloroform was added, the resin was filtered off, and the filtrate was washed with aqueous sodium bicarbonate and water, dried and evaporated. Thin-layer chromatography showed the residue to consist essentially of the 17-mono-acetate, with traces of starting material and 11,17-di-acetate.

The following examples (a) to (m) illustrate topical formulations prepared in accordance with the invention. In each example the active ingredient used is 17α-acetoxy-9α - fluoro - 11β - hydroxy - 16β - methylpregna - 1,4-diene-3,20-dione, but it will be appreciated that this substance may be replaced by other active compounds used in accordance with the invention.

Example 13.—9α - fluoro - 11β - hydroxy - 16α - methyl-17α - propionyloxypregna - 1,4 - diene - 3,20 - dione (21-desoxy-dexamethasone 17-propionate)

21-desoxydexamethasone (0.5 g.) and p-toluenesulphonic acid (0.5 g.) were added to benzene (40 ml.) and propionic anhydride (4 ml.), and the solution was boiled under reflux for 46 minutes. The benzene was evaporated off, ethanol and sodium bicarbonate solution were added and the mixture was then stirred for 30 minutes to decompose the excess propionic anhydride. The solution was extracted with chloroform and the extract was washed with water, dried (MgSO$_4$) and evaporated. The crude product contained a trace of 21-desoxydexamethasone, ca. 55% of the 17-propionate and ca. 40% of the 11,17-dipropionate as judged by thin layer chromatography. The 17-propionate was separated by preparative layer chromatography on Kieselgel G with benzene-ethyl acetate (3:1) as developing solvent. Crystallisation from acetone-hexane gave 21-desoxydexamethasone 17-propionate (90 mg.), M.P. 213–218°. (Found: C, 69.4; H. 7.5. C$_{25}$H$_{33}$FO$_5$ requires C, 69.3; H, 7.7%.)

The following Examples (a)–(d) illustrate the preparation of ointments.

Example a

| | Percent w./w. |
|---|---|
| Active ingredient | 0.1 |
| Liquid paraffin B.P. | 10.0 |
| White soft paraffin to produce 100 parts by weight. | |

Ball-mill the steroid with a little of the liquid paraffin until the particle size is reduced to 95% by number below 5μ. Dilute the paste and rinse out the mill with the remaining liquid paraffin, mix and add the suspension to the melted white soft paraffin at 50° C. Stir until cold to give a homogeneous ointment.

Example b

| | Percent w./w. |
|---|---|
| Active ingredient | 0.25 |
| Aluminium stearate | 3.2 |
| Liquid paraffin B.P. to 100 parts. | |

Disperse the aluminium stearate in the liquid paraffin by vortex stirring and heat the suspension with continued stirring, at a temperature rise rate of 2° C. per minute until 90° C. is reached. Maintain the temperature at 90–95° C. for 30 minutes until solution is complete and a gel is formed. Cool quickly, preferably by the use of cooling coils or concentric cooling rings to produce a transparent solid gel. Mill the active ingredient to produce microfine particles of which not less than 90% by number are below 5μ. Triturate with a small portion of the gel and incorporate the remaining gel to give a homogeneous mix.

Example c

| | Percent w./w. |
|---|---|
| Active ingredient | 0.1 |
| Woolfat | 12.0 |
| Cetostearyl alcohol B.P.C. | 20.0 |
| Liquid paraffin B.P. | 25.0 |
| White soft paraffin to 100 parts w./w. | |

Ball-mill the steroid with a little of the liquid paraffin as in Example a and add the resulting paste, diluted with the remaining liquid paraffin, to a mixture of cetostearyl alcohol, woolfat and white soft paraffin, melted together by gentle warming. Stir until cold to give a homogeneous mix.

Example d

| | Percent w./w. |
|---|---|
| Active ingredient | 0.5 |
| Hydrogenated lanolin e.g. Lanocerina sold by Croda Ltd. of London, W.C.2. England | 20.0 |
| Liquid paraffin B.P. | 15.0 |
| White soft paraffin to 100 parts w./w. | |

Ball-mill the steroid with liquid paraffin as in Example a, and add the resulting paste, diluted with the remaining liquid paraffin to the mixture of hydrogenated lanolin and white soft paraffin, melted together by gently warming. Stir until cold to give a homogeneous mix.

The following Examples e and f illustrate the preparation of water-miscible creams:

Example e

| | Percent w./w. |
|---|---|
| Active ingredient | 0.1 |
| Beeswax (white) | 15.0 |
| Cetostearyl alcohol B.P.C. | 7.0 |
| Cetomacrogel 1000 B.P.C. | 3.0 |
| Liquid paraffin B.P. | 5.0 |
| Chlorocresol | 0.1 |
| Distilled water to produce 100 parts by weight. | |

Ball-mill the steroid with a little liquid paraffin as described in Example a. Heat the available water to 100° C. add the chlorocresol, stir to dissolve and cool to 65° C. Melt together the beeswax, cetostearyl alcohol and cetomacrogel and maintain at 65° C. Add the steroid suspension using the remaining liquid paraffin for rinsing. Add the steroid oily phase at 60° C. to the chlorocresol aqueous phase at 65° C. and stir rapidly while the emulsion cools over the gelling point (40–45° C.). Continue to stir at slow speed until the cream sets.

Example f

| | Percent w./w. |
|---|---|
| Active ingredient | 0.1 |
| Cetostearyl alcohol B.P.C. | 7.2 |
| Cetomacrogel 1000 B.P.C. | 1.8 |
| Liquid paraffin B.P. | 6.0 |
| White soft paraffin | 15.0 |
| Chlorocresol | 0.1 |
| Distilled water to produce 100 parts by weight. | |

Prepare as described in Example e, replacing the beeswax with white soft paraffin in the oily phase.

The following Examples g and h illustrate the preparation of lotions:

Example g

| | Percent w./v. |
|---|---|
| Active ingredient | 0.25 |
| Lanbritol wax[1] | 0.93 |
| Diethylene glycol monostearate | 0.65 |
| Cetostearyl alcohol B.P.C. | 0.65 |
| Liquid paraffin B.P. | 1.95 |
| Glycerin | 5.0 |
| Isopropyl alcohol | 6.5 |
| Methyl p-hydroxy benzoate | 0.15 |
| Distilled water to produce 100 volumes. | |

[1] Lanbritol wax is a non-ionic wax for stabilizing emulsions consisting of a mixture of fatty alcohols with polyethylene glycol ethers of fatty alcohols sold by Ronsheim Moore of London W.C.1, England.

Ball-mill the steroid with half the glycerin, as in Example a, and use the isopropyl alcohol for dilution and rinsing purposes.

Melt together the lanbritol wax, diethylene glycol monostearate, cetostearyl alcohol and liquid paraffin and maintain at 60° C. Heat the available water and remaining glycerin to 95° C. Add the methyl parahydroxy benzoate and stir until dissolved. Cool to 65° C. Add the oily mix at 60° C. to the aqueous phase at 65° C. and allow to cool while stirring rapidly until the emulsion gels at 40–45° C., thereafter stir slowly. Add the well mixed steroid suspension slowly to the lotion base and stir to obtain a homogeneous mix.

Example h

| | Percent w./v. |
|---|---|
| Active ingredient | 0.05 |
| Tween 80 (polyoxyethylene sorbitan monooleate) | 0.01 |
| Carbopol 934 (carboxy vinyl polymers) | 0.3 |
| Diethanolamine (approx.) | 0.5 |
| Distilled water to produce 100 vols. | |

Ball-mill the steroid with a little water and the Tween 80 as in Example a. Disperse the Carbopol 934 in the available water by vortex stirring. Add the diethanolamine slowly with stirring until the clear thickened mix has a pH of 7.0. Incorporate the steroid slurry into the lotion base and mix well.

Example i

Aerosol spray lotion:

| | | |
|---|---|---|
| Active ingredient (microfine) | mgm | 2.5 |
| Dichlorodifluoromethane | g | 16.32 |
| Trichlorofluoromethane | g | 24.48 |
| Fractionated coconut oil to 1.20 g. | | |

Dry the steroid overnight at 60° C. under vacuum and over phosphorus pentoxide. Ball-mill the dried powder for at least 4 hours with a little of the dried filtered oil. Rinse out the mill with more dried filtered oil and pass the suspension through a 325 mesh B.S. sieve. Assay the suspension and dilute with more dried filtered oil to the required concentration. Incorporate the suspension into the pressure container with the propellants in a conventional manner.

Example j

Aphthous ulcer pellets: | Mg.
--- | ---
Active ingredient (microfine) | 0.25
Lactose | 69.90
Acacia | 3.00
Magnesium stearate | 0.75

Pass the steroid, lactose and acacia, separately through a No. 60 B.S. mesh sieve. Blend the powders and granulate with 50% ethanol in water. Pass the mass through a No. 12 mesh B.S. sieve and dry the granules at 50° C. Pass the dried granules through a No. 20 mesh B.S. sieve and blend in the magnesium stearate, previously passed through a No. 100 mesh B.S. sieve. Compress in a conventional manner on 7/32 inch diameter punches, to give a pellet that will dissolve slowly in the mouth.

Example k

Retention enema: | Percent
--- | ---
Active ingredient (microfine) w./v | 0.0005
Tween 80 w./v | 0.05
Ethanol w./v | 0.015
Methyl p-hydroxy benzoate w./v | 0.08
Propyl p-hydroxy benzoate w./v | 0.02
Distilled water to 100 vols. |

Heat the available water to 95° C., add the methyl and propyl p-hydroxy benzoates and stir to dissolve. Cool the vehicle to room temperature. Disperse the steroid in the ethanol and add to the Tween 80; warm the mixture to 50° C. and stir until the steroid is in solution. Add the steroid solution to the vehicle, stirring vigorously to avoid precipitation, and make up to volume with water if required. Distribute the enema into plastic bags e.g. P.V.C. bags for self-administration or into other containers suitable for use.

Example l

Eye drops: | Percent
--- | ---
Active ingredient w./v | 0.025
Tween 80 w./v | 2.5
Ethanol w./v | 0.75
Benzalkonium chloride w./v | 0.02
Phenyl ethanol w./v | 0.25
Sodium chloride w./v | 0.60
Water for injection to 100 vols. |

Dissolve the sodium chloride, benzalkonium chloride and phenyl ethanol in the water for injection. Suspend the steroid in the alcohol and add to the Tween 80. Warm the mixture to 50° C. and stir until dissolved. Add the steroid solution to the eye-drop vehicle with rapid stirring to obtain a clear solution. Sterilise the bulk by filtration through a sintered glass filter and distribute into sterile small well filled, neutral glass eye-drop containers.

Example m

Nasal drops: | Percent
--- | ---
Active ingredient w./v | 0.005
Tween 80 w./v | 0.05
Alcohol 95% w./v | 0.15
Methyl paraben (p-hydroxy benzoate) w./v | 0.04
Propyl paraben (p-hydroxy benzoate) w./v | 0.02
Sodium chloride w./v | 0.70
Distilled water to 100 vols. |

Dissolve the sodium chloride and the parabens in the distilled water heated to 95° C., and allow the solution to cool. Disperse the steroid in the alcohol and add to the Tween 80. Warm the mixture to 50° C. and stir until solution of the steroid is effected. Add the steroid solution to the vehicle with rapid stirring to obtain a clear solution. Filter the solution free from particulate matter through a sintered glass filter and distribute into small, well filled containers.

We claim:
1. Steroid compounds of the formula

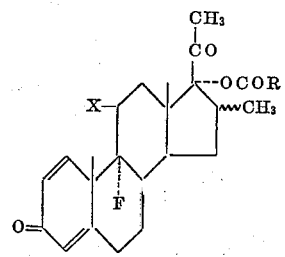

(I)

wherein X is a hydroxyl group in the β-configuration and R is an alkyl group having one to three carbon atoms.

2. 17α-acetoxy-9α-fluoro - 11β - hydroxy-16β-methylpregna-1,4-diene-3,20-dione.

3. 17α - acetoxy-9α-fluoro-16β-methylpregna-1,4-diene-3,11,20-trione.

4. 17α-propionyloxy - 9α - fluoro - 11β - hydroxy-16β-methylpregna-1,4-diene-3,20-dione.

5. 17α - propionyloxy-9α-fluoro-16β-methylpregna-1,4-diene-3,11,20-trione.

6. 17α - butyryloxy-9α-fluoro-11β-hydroxy-16β-methylpregna-1,4-diene-3,20-dione.

7. 17α-isobutyryloxy - 9α - fluoro - 11β - hydroxy-16β-methylpregna-1,4-diene-3,20-dione.

8. 9α-fluoro - 11β - hydroxy-16α-methyl-17α-propionyloxypregna-1,4-diene-3,20-dione.

9. A pharmaceutical composition for use in the topical treatment of inflammations comprising a steroid compound of the formula

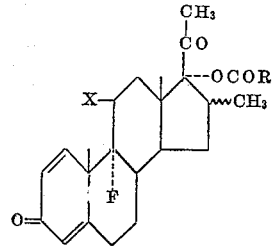

(I)

wherein X is a hydroxyl group in the β-configuration and R is an alkyl group having one to three carbon atoms in association with a topical vehicle for said steroid.

10. A composition as claimed in claim 9 containing from 0.001% to 5% by weight of said steroid.

11. A composition as claimed in claim 9 in which the topical vehicle is selected from the group consisting of lotions, powder, drops, supository, retention enema, chewable tablet, suckable tablet, pellet chewable pellet, suckable, aerosol, ointments and creams.

12. A pharmaceutical composition selected from the group consisting of ointments, creams, lotions, powders, drops, suppositories, retention enemas, chewable tablets, suckable tablets and aerosols said composition containing as active ingredient from 0.001% to 5% by weight of a steroid compound of the formula:

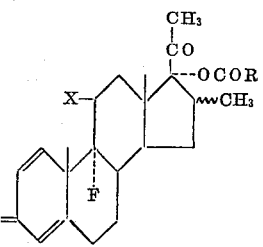

(I)

wherein X is a hydroxyl group in the β-configuration and R is an alkyl group having one to three carbon atoms.

13. A pharmaceutical composition comprising from 0.0001% to 5% by weight of 17α-propionyloxy-9α-fluoro-11β - hydroxy-16β-methylpregna-1,4-diene-3,20-dione and a topical vehicle therefor.

14. A method for the topical treatment of topical inflammation which comprises applying to the inflamed area a steroid compound of the formula:

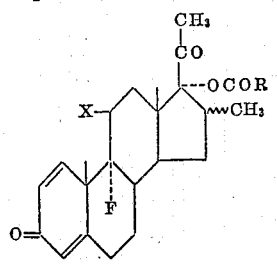

(I)

wherein X is a hydroxyl group in the β-configuration and R is an alkyl group having one to three carbon atoms.

15. A method of treatment as claimed in claim 14 in which said steroid is 17α-propionyloxy-9α-fluoro-11β-hydroxy-16β-methylpregna-1,4-diene-3,20-dione.

References Cited

UNITED STATES PATENTS

| 3,104,246 | 9/1963 | Amiard et al. | 260—397.45 |
| 3,115,491 | 12/1963 | Muller | 260—397.45 |
| 3,152,154 | 10/1964 | Ercoli et al. | 260—397.45 |
| 3,157,679 | 1/1964 | Bork | 260—397.45 |

ELBERT L. ROBERTS, *Primary Examiner.*

UNITED STATES PATENT OFFICE
CERTIFICATE OF CORRECTION

Patent No. 3,376,193  April 2, 1968

Joseph Elks et al.

It is certified that error appears in the above identified patent and that said Letters Patent are hereby corrected as shown below:

Column 4, line 8, "7.2" should read -- 70.2 --. Column 5, line 63, "9-fluoro" should read -- 9 alpha fluoro --. Column 6, line 59, "46 minutes" should read -- 45 minutes --. Column 8, line 27, "6.5% w/w" should read -- 6.5% w/v --. Column 9, line 61, "0.15% w/v" should read -- 0.15% v/v --; line 67, "chcloride" should read -- chloride --. Column 10, lines 51 and 52, "pellet chewable pellet, suckable" should read -- chewable pellet, suckable pellet --.

Signed and sealed this 14th day of October 1969.

(SEAL)

Attest:

Edward M. Fletcher, Jr.  
Attesting Officer

WILLIAM E. SCHUYLER, JR.  
Commissioner of Patents